F. T. RITTER.
AUTOMATIC STOPPING MEANS FOR TRACTORS.
APPLICATION FILED APR. 23, 1919.
1,321,334. Patented Nov. 11, 1919.
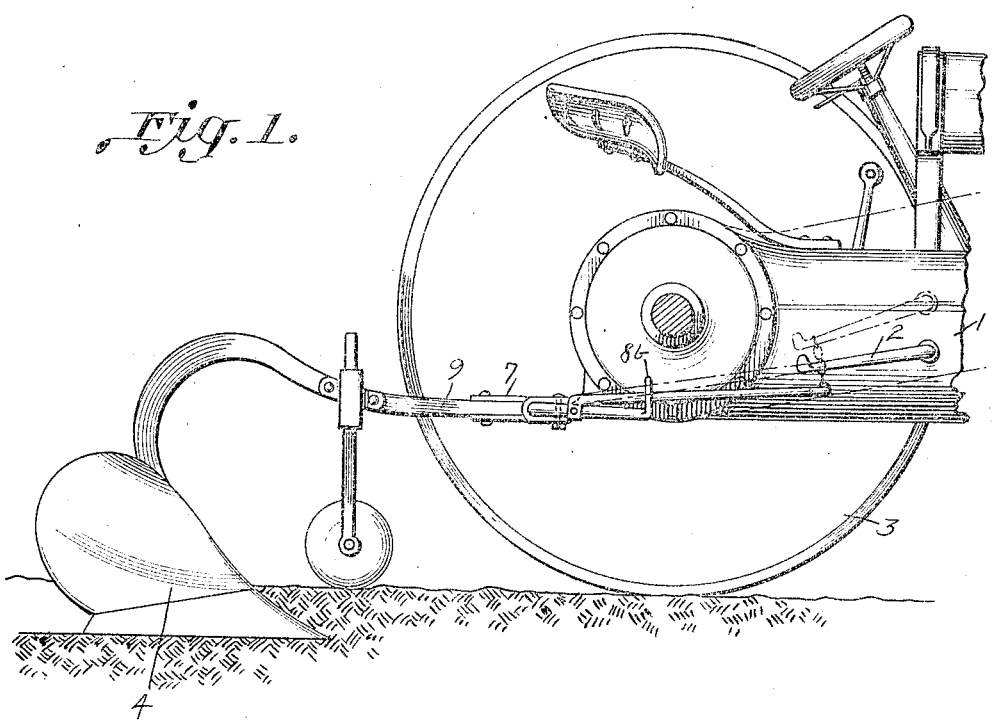
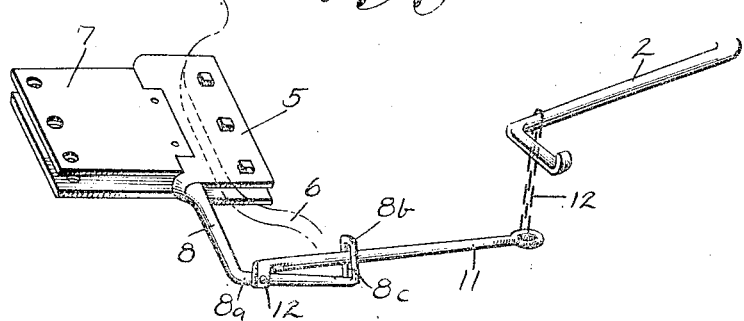
INVENTOR
F. T. Ritter,
BY
ATTORNEYS

UNITED STATES PATENT OFFICE.

FRANK TRINE RITTER, OF EDGERLEY, LOUISIANA.

AUTOMATIC STOPPING MEANS FOR TRACTORS.

1,321,334.

Specification of Letters Patent.  Patented Nov. 11, 1919.

Application filed April 23, 1919. Serial No. 292,013.

*To all whom it may concern:*

Be it known that I, FRANK TRINE RITTER, a citizen of the United States, and a resident of Edgerley, in the parish of Calcasieu and State of Louisiana, have invented certain new and useful Improvements in Automatic Stopping Means for Tractors, of which the following is a specification.

My invention relates to devices for automatically stopping tractors, and it consists in the combinations, constructions and arrangements herein described and claimed.

In the use of light tractors for farm work and the like, difficulty has often been experienced because of the tendency of the tractor to rear up when an obstruction is encountered, as for instance when a plow strikes a root or a stump. Unless the power can be shut off very quickly, the tractor is liable to be overturned.

An object of my invention is to provide a device by means of which a tractor may be automatically stopped whenever there is any tendency for the tractor to rear.

A further object of my invention is to provide a device which may be easily attached to any tractor and which will operate instantly to stop the tractor when the latter has reached a predetermined angle with respect to the ground over which it is traveling, thereby preventing the overturning of the tractor.

Other objects and advantages will appear in the following specification, and the novel features of the invention will be particularly pointed out in the appended claims.

My invention is illustrated in the accompanying drawing forming a part of this specification, and wherein:

Figure 1 is a side view of a portion of a tractor and a plow drawn thereby, the tractor being equipped with my improved stopping device, and Fig. 2 is a perspective view of the stopping device.

Referring now to Fig. 1, I have shown therein a tractor having a body portion 1 upon which is carried a clutch lever 2. The tractor has the usual tractor wheels such as that shown at 3. Any implement may be drawn by the tractor. In the present instance I have shown a plow 4. The means for attaching the plow to the tractor is shown in Fig. 2. In this figure a U-shaped member 5 which may be made of sheet metal or of cast metal, is bolted rigidly to the rigid draw-bar 6 of the tractor. The member 7 is rigidly secured to a pintle 8 at one end, the opposite end being rigidly secured to the tongue or draw-bar 9 of the plow, as shown in Fig. 1. The member 5 is loosely mounted on the pintle 8. It constitutes in fact a half hinge. The pintle 8 has an elbow $8^a$ and is provided at its end with an upturned portion $8^b$ having a slot $8^c$. An arm 11 is pivotally mounted at 12 on the laterally extending portion of the pintle 8 and extends through the slot $8^c$, the outer end of the arm 11 being connected with the clutch lever 2 by means of the chain 12.

From the foregoing description of the various parts of the device, the operation thereof may be readily understood. When the tractor is pulling the plow under ordinary conditions, the arm 11 will move up and down in the slot $8^c$ following the movement of the tractor. When, however, the load becomes too great as when the plow strikes a stump or root, thus tending to cause the tractor to rear, the latter moving upwardly and carrying with it the clutch lever 2, brings the arm 11 to the top of the slot. The hinge members 7 and 5 are held in substantially a horizontal position since the line of force exerted by the tractor is substantially parallel with the ground. Any further movement of the tractor will cause the clutch lever to be swung downwardly, thereby releasing the clutch and stopping the tractor.

It is obvious that the arm 11 might be attached to any movable member whose movement would result in the stopping of the tractor as for instance the spark lever or the throttle lever, without departing from the spirit of the invention.

The device, which has been tried out in practice, has been found to operate successfully in each instance to stop the tractor when it is stalled by an excessive load. While I have shown the tractor as drawing a plow, it is obvious of course that any suitable implement might be used without departing from the spirit and scope of the invention.

The length of the chain 12 may be adjusted so that the stopping of the tractor may be set for any predetermined angle with respect to the ground over which the tractor is proceeding.

I claim:—

1. The combination with a tractor having a control lever of a movable means for connecting a load to the tractor and means actuated by the movable means for moving the control lever to stop the tractor when the said movable means reaches a predetermined angle with respect to the ground.

2. The combination with a tractor having a control lever, of means for securing a load to the tractor and means carried by said securing means for actuating the control lever when the securing means is at a predetermined angle with respect to the ground.

3. The combination of a tractor having a control lever, a load drawn by the tractor, a hinge disposed between the tractor and the load, and means carried by the hinge for moving the control lever when the tractor or the load has reached a predetermined angle with respect to the ground.

4. The combination with a tractor having a control lever, of a load drawn by the tractor, a hinge for connecting the load with the tractor, an arm secured to one member of the hinge and having a slot, a second arm pivotally mounted on the first named arm, and arranged to extend through the slot, and means for connecting the end of the second said arm to the said control lever.

5. The combination with a tractor having a control lever, of a load adapted to be drawn by the tractor, a pair of hinge members, one of said hinge members being connected to the tractor and the other being connected to the load, a pintle secured to one of said hinge members and having an elbow, the outer end of the pintle being upturned and being provided with a slot, an arm pivotally mounted on the said pintle and arranged to extend through the slot, and means for securing the end of said last named arm with the said control lever.

FRANK TRINE RITTER.

Attest:
M. R. STEWART,
G. W. LACK.